O. LADD.
RAILWAY RAIL FASTENER.
APPLICATION FILED NOV. 10, 1921.
1,410,479.
Patented Mar. 21, 1922.
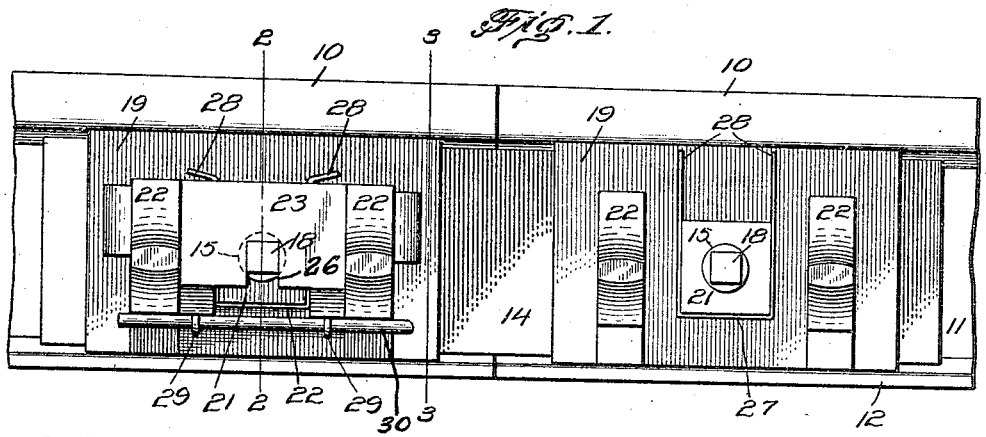
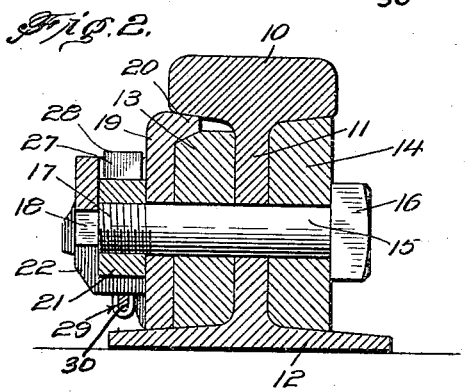
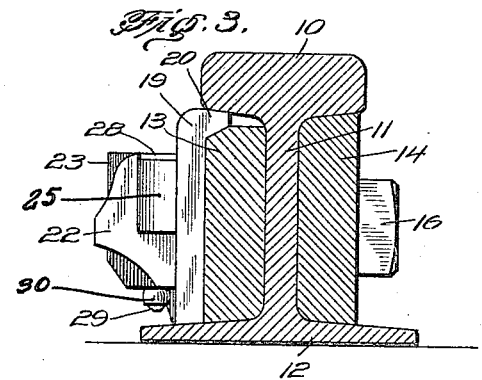
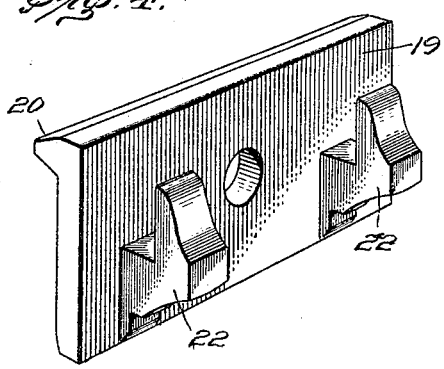
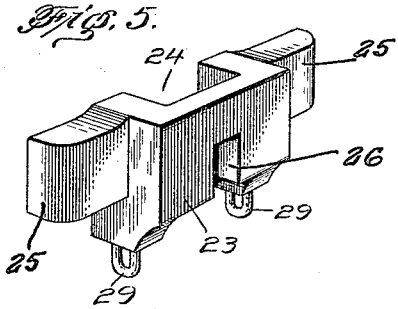
Oliver Ladd, INVENTOR.
BY Geo. F. Kimmel, ATTORNEY.

UNITED STATES PATENT OFFICE.

OLIVER LADD, OF DYERSBURG, TENNESSEE.

RAILWAY-RAIL FASTENER.

1,410,479. Specification of Letters Patent. Patented Mar. 21, 1922.

Application filed November 10, 1921. Serial No. 514,304.

*To all whom it may concern:*

Be it known that I, OLIVER LADD, a citizen of the United States, residing at Dyersburg, in the county of Dyer and State of Tennessee, have invented certain new and useful Improvements in Railway-Rail Fasteners, of which the following is a specification.

This invention relates to railway rail fasteners, and has for one of its objects to improve the construction and increase the efficiency and utility of devices of this character.

Another object of the invention is to provide a device of this character which may be adapted without material structural change in the device to rails of various sizes and forms and without any change whatever in the rails.

With these and other objects in view, the invention consists in certain novel features of construction as hereinafter shown and described and then specifically pointed out in the claim, and in the drawings illustrative of the preferred embodiment of the invention:—

Figure 1 is a side elevation of the improved device with parts at one side removed.

Fig. 2 is a transverse section on the line 2—2 of Fig. 1.

Fig. 3 is a transverse section on the line 3—3 of Fig. 1.

Fig. 4 is a perspective view of one of the holding plates.

Fig. 5 is a perspective view of one of the locking members.

The improved device may be applied to railway rails of various sizes and proportions, and for the purpose of illustration is shown applied to the confronting ends of a pair of rails each including the head or ball portions 10, the web portions 11 and the tie flange portions 12.

Bearing against the opposite faces of the webs 11 are clamp plates 13 and 14, and extending through the clamp plates and likewies through the webs 11, are clamp bolts 15, the heads 16 of the bolts bearing against the plate 14.

The bolts 15 are long enough for the threaded ends 17 to extend for a considerable distance beyond the plate 13 and each has a polygonal terminal, for instance square, as shown at 18.

Bearing against the clamp plate 13 adjacent each of the bolts 15 and apertured to receive the same, is a holding plate 19, each with a lip 20 overhanging the plate 13, the latter being recessed where the lip engages to assist in supporting it in position.

The clamp nuts 21 of the bolt when in position bear respectively against the holding member 19 as shown.

Each of the holding plates 19 is provided with hooked projections 22 at opposite sides of the nuts 21 and spaced therefrom.

A locking member 23 is provided for each of the nuts 21 and is formed with a recess or socket 24 to engage over the nut 21 and hold it from turning on the bolt, and likewise provided with extensions 25 to engage the hooked projections 22.

The body of the member 23 is likewise formed with a downwardly opening socket 26 to engage over the polygonal terminal 18 of the bolt and thus hold the bolt from rotation.

A locking strip 27 of bendable material, initially in U-shape, is engaged around three sides of the nut and the terminals 28 are bent outwardly over the adjacent portions of the member 23, as shown in Fig. 1 at the left, as one means for holding the locking member in position and preventing upward displacement.

Projecting downwardly from the member 23 are loops 29 to receive a locking bolt or pin 30 and serving as another means for holding the member 23 from upward displacement.

In applying the improved device, the clamp plates 13 and 14 and the holding plates 19 are disposed in position and the bolts 15 likewise disposed in position and the nuts 21 applied to the bolts. A wrench of suitable form is then engaged with the nut between the hooked projections 22 and operating to hold the nut from turning, and another wrench applied to the head 16 and the bolt turned "home." The member 23 is then applied and the members 27 and 30 likewise applied as before described.

The improved device forms a complete and effectual fastening means whereby the rail ends are firmly held from displacement, and the nuts of the clamp bolts are likewise effectually locked in position on the bolts and prevented from working loose under the severe jars and strains of the rolling stock passing over the rails.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

A railway rail fastener comprising clamp members adapted to bear against the opposite faces of the webs of a pair of rails at their confronting ends, clamp bolts extending through said plates and the portions of the rail webs therebetween, each clamp bolt having a polygonal portion in advance of the threaded portion, holding plates engaging one of said clamp plates, and apertured to receive said clamp bolts, each of said holding plates having hooked projections at opposite sides of its bolt aperture, a locking member engaging the hooked projections of each holding plate and provided with a socket to receive the clamp nut and a socket to receive the polygonal portion of the bolt, and rods operating to anchor the locking member to the holding plate.

In testimony whereof, I affix my signature hereto.

OLIVER LADD.